United States Patent Office 3,835,046
Patented Sept. 10, 1974

3,835,046
DEWATERING OF AQUEOUS SUSPENSIONS
Alfred J. Restaino, Wilmington, Del., assignor to ICI America Inc., Wilmington, Del.
No Drawing. Filed Feb. 14, 1972, Ser. No. 226,280
Int. Cl. B01d 21/01
U.S. Cl. 210—54
19 Claims

ABSTRACT OF THE DISCLOSURE

A process is provided for dewatering aqueous suspensions of solid materials which comprises mixing into such a suspension a water-soluble, cationic polymer of N-vinyl imidazole or salt thereof, the amount of N-vinyl imidazole polymer employed being sufficient to condition the suspension for dewatering and separating water from the conditioned suspension.

---

The present invention relates to the treatment of aqueous suspensions of finely-divided solid materials to facilitate the removal of water therefrom by such processes as filtration, sedimentation, elutriation, and decantation, and variations thereof, in which the water remains in liquid phase throughout such removal. This invention is particularly concerned with a process for conditioning sewage sludges to effect rapid and efficient dewatering thereof.

It is well known in the art that aqueous suspensions of agglomerated organic solids may be dewatered by any one of, or combination of, several techniques involving compaction, filtration, or flotation operations. Regardless of the dewatering technique used, aqueous suspensions of predominantly organic solids, such as sewage sludges, are most difficult to dewater due to the extremely hydrophilic and amorphous nature of the solids. Such suspensions are usually essentially non-free settling at concentrations above about 0.1% by weight. That is, little or no densification occurs under gravity without further mechanical or chemical conditioning. Illustrative of such essentially non-free settling suspensions of organic solids are the raw, digested and activated municipal sewage sludges. In order to dewater such sludges by vacuum filtration, it is frequently necessary to employ as much as 50 to 200 pounds, per ton of dispersed organic solids, of inorganic additives such as lime, ferric chloride, ferric sulfate, aluminum chloride, and alum. Within recent years, numerous publications have appeared which disclose that suspensions of organic solids, such as sewage, can be dewatered with cationic polymers. While cationic polymers can be employed to condition sewage sludges for filtration, prior to the present invention the amount of cationic polymer required for this purpose rendered the treatment economically unsatisfactory for many operations. It would be desirable to have a cationic dewatering agent which is more effective than cationic dewatering agents known heretofore so that lower amounts of cationic polymer may be employed to dewater suspensions of solid materials.

Accordingly, it is an object of the present invention to provide a novel process to promote more efficient and rapid dewatering of aqueous suspensions of finely-divided solid materials.

It is another object of this invention to provide a sewage dewatering process which causes rapid flocculation and sedimentation of solids in order to reduce the solids load on the secondary clarifiers of a conventional water waste treatment plant.

It is also an object of this invention to provide a dewatering process which is highly efficient and economical, which reduces the volume of the solids for subsequent disposal, and which also changes the consistency and properties of the solids so that they may be more easily filtered and processed.

The foregoing objects and still further objects of this invention are essentially realized by providing a novel process for facilitating the dewatering of aqueous suspensions of finely-divided solid materials by incorporating therein a water-soluble, cationic polymer of N-vinyl imidazole. It has been found, in accordance with the present invention, that the treatment of an aqueous suspension of solid materials, such as sewage sludge, with a N-vinyl imidazole polymer results in the rapid and efficient dewatering of the solid materials therein so as to reduce the volume of the solids for disposal and, also, to improve the consistency and properties of the solids so that they may be more easily filtered and processed.

The cationic N-vinyl imidazole polymers which are employed in the process of the present invention may be any water-soluble polymer of N-vinyl imidazole or salt thereof which contains sufficient cationic moieties to furnish an overall cationic characteristic to the polymer. Within the foregoing description, a class of N-vinyl imidazole polymers which are particularly useful in the process of the present invention are the cationic, water-soluble polymers containing at least 5 weight percent of polymerized N-vinyl imidazole moieties or salt thereof and having an intrinsic viscosity in 2 normal sodium chloride at 25.5° C. of from about 0.2 deciliters per gram to about 15 deciliters per gram.

A particularly preferred class of cationic N-vinyl imidazole polymers which may be employed in the process of the present invention include those containing from 5% to 100% by weight, and preferably from 10% to 80% by weight, of polymerized N-vinyl imidazole or salt thereof and from 95% to 0% by weight, and preferably from 90% to 20% by weight, of at least one polymerized monomer characterized by the formula (1) 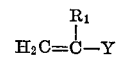

wherein $R_1$ is hydrogen or an alkyl radical containing from 1 to 4 carbon atoms and Y is

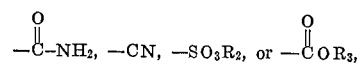

wherein $R_2$ is hydrogen or alkali metal and wherein $R_3$ is hydrogen, alkali metal or —$OCH_2CH_2N(R)_3 \cdot X$, wherein each R is independently an alkyl group having from 1 to 4 carbon atoms and X is an anion, with the proviso that the polymer does not contain more than 25% by weight of polymerized monomer characterized by the formula

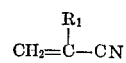

wherein $R_1$ is hydrogen or an alkyl group containing from 1 to 4 carbon atoms. X may be any anion such as hydroxyl or negative, salt-forming radicals. Illustrative examples of these negative radicals include halides, such as chloride, bromide and iodide, sulfate, for example, the methyl sulfate anion, and especially the anion which results from the quaternization of an amino group with diethyl sulfate, benzyl chloride, dimethyl sulfate, acetate, formate, bisulfate, and propionate. Illustrative examples of compounds falling within the scope of Formula (1) include acrylamide, methacrylamide, acrylonitrile, acrylic acid, methacrylic acid, vinyl sulfonic acid, and salts of these acids, such as sodium acrylate, potassium acrylate, sodium methacrylate, and lithium acrylate, and the quaternary salts of dimethylaminoethyl acrylate and dimethylaminoethyl methacrylate. As will be readily apparent to those skilled in the art, the foregoing description of the polymers which may be employed in the process of the present invention include homopolymers of N-vinyl imidazole salts and copolymers of N-vinyl imidazole and salts thereof with one or more other monomers, provided that the polymer is water-soluble and cationic. Accordingly, when the polymer contains both cationic and anionic moieties, the ratio of cationic to anionic moieties in the polymer should be greater than one.

The term "N-vinyl imidazole" as used herein includes compounds which may be characterized by the generalized formula

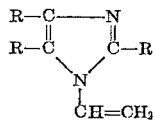

wherein each R is independently H or an alkyl group containing from 1 to 3 carbon atoms, with the proviso that the total number of carbon atoms present in the R groups does not exceed 4. Illustrative examples of such compounds include 1-vinyl imidazole, 1-vinyl-2-methylimidazole, 1 - vinyl-2-isopropylimidazole, 1-vinyl-2-ethylimidazole, 1-vinyl-2-propylimidazole, 1-vinyl-2,4-dimethylimidazole, 1 - vinyl-5-methylimidazole, and 1-vinyl-2,4,5-trimethylimidazole.

The term "salt" is employed here to include not only the ordinary salts formed by reacting one or more nitrogens of the imidazole ring with an organic acid, inorganic acid, or acid salt to form an ordinary salt; but, also, the term is employed herein to include the quaternary ammonium salts formed by quaternizing one or more of the nitrogen atoms of the imidazole ring. Illustrative examples of acids which may be employed to prepare the ordinary salts include hydrochloric, hydrobromic, hydroiodic, sulfuric, ammonium sulfate, sodium bisulfate, potassium bisulfate, monomethyl hydrogen sulfate, sulfurous, sodium bisulfite, alkane sulfonic, benzene sulfonic, p-toluene-sulfonic, phosphoric, sodium acid phosphates, nitric, acetic propionic, citric sulfamic, glycolic, diglycolic, and ethylenediamine-tetraacetic. A preferred class of ordinary salts are prepared by reacting a nitrogen atom of the imidazole ring with a strong acid such as hydrochloric or sulfuric. Alkylating agents which may be employed to prepare the quaternary ammonium salts include, for example, methyl chloride, methyl bromine, ethyl chloride, diethyl sulfate, benzyl chloride, dimethyl sulfate, dimethyl sulfite, and dimethyl phosphite. The salt may be formed by reacting the appropriate acid or alkylating agent with the N-vinyl imidazole monomer or with the N-vinyl imidazole polymer.

While the polymers of the present invention may be employed in free-base form, it is preferably used in the salt form, either the simple salt with an acid or the quaternary salt. In the following general description, reference to a "salt" of the polymer is intended, unless specifically noted otherwise, generically to embrace both the simple salts of the polymer with acids and the quaternary ammonium salts thereof.

The term "water-soluble" as used herein is intended to include polymers which produce true-solutions or colloidal solutions when they are present in the aqueous media in the proportions hereinafter specified.

The water-soluble, cationic polymers employed in the process of the present invention are preferably polymers characterized by exhibiting an intrinsic viscosity in 2 normal sodium chloride at 25.5° C. of at least 0.2 deciliters per gram. Although the performance of the polymers tends to improve with increasing molecular weight, polymers having an intrinsic viscosity above about 15 deciliters per gram in 2 normal sodium chloride at 25.5° C. are more difficult to prepare than the lower molecular weight polymers. Accordingly, the polymers most frequently used in the process of this invention have an intrinsic viscosity of not more than about 15 deciliters per gram in 2 normal sodium chloride at 25.5° C. It should be remembered, however, that polymers having an intrinsic viscosity below 0.2 and above 15 may be used if desired. It is generally preferred to work with polymer sin the range of 1 deciliter per gram to about 8 deciliters per gram because these materials are especially effective and can be readily dissolved in water to produce more concentrated solutions than the polymers of higher intrinsic viscosity.

The cationic polymers of the present invention may be prepared by polymerization techniques conventional in the art for the preparation of high molecular-weight polymers. In general, the cationic polymers used in the process of the present invention may be prepared by subjecting an aqueous solution of the monomer or mixture of monomers to the influence of gamma radiation of an intensity of from 1,000 to 1 million rads per hour and a total dose of from 1,000 to 10 million rads. The cationic polymers may also be prepared by conventional polymerization techniques such as by heating an aqueous solution of the monomer or mixture of monomers in the presence of a free radical catalyst such as benzoyl peroxide or potassium persulfate for a sufficient period of time to form the high molecular-weight cationic polymers. The particular means employed to prepare the cationic polymers employed in the process of the present invention is not critical and form no part of this invention.

The process of the present invention for facilitating the dewatering of aqueous suspensions of solid materials may be carried out by treating the aqueous suspension of solid materials to be dewatered with a water-soluble, cationic polymer hereinbefore described. The treatment is accomplished by adding the polymer directly to the aqueous suspension or by adding the cationic polymer in the form of a dilute aqueous solution to the suspension. The aqueous suspension is usually agitated during addition of the polymer. The polymer solution added is generally made up to provide a predetermined desired cationic polymer dosage at a given dilution level. Thus, the polymer solution may contain anywhere from as little as about 0.001% up to as much as 40% or more by weight polymer solids. While neither of these limits is critical, the lower limit represents a practical dilution limit and the upper limit represents an approximate physical limit for the convenient and practical handling of the high molecular-weight cationic polymer solutions which at or substantially above this concentration may become too viscous for convenient manipulation. Acid and/or neutral salts may be added to the polymer solution to lower viscosity and make the solution more readily pumpable. While any acid or neutral salt may be used, alkaline salts should be avoided as these may tend to degrade the quaternary salts of the polymers. Illustrative examples of salts which may be employed include sodium sulfate, sodium chloride, aluminum sulfate, and ammonium sulfate.

The total dosage of the cationic polymer used will vary somewhat according to the chemical nature and molecular weight of the polymer employed and will depend a great deal on the particular suspension being dewatered. In general, satisfactory results have been obtained when the amount of high molecular-weight cationic polymer used varies within the range of from about 0.5 to 50 pounds of polymer per ton of solids on a dry basis. Frequently, the amount employed is within the range of from about 1 to 15 pounds of polymer per ton of solids on a dry basis. These amounts of polymer are particularly useful when the sludge is dewatered on a coil filter or a centrifuge.

Agitation of the aqueous dispersion during the addition of the cationic polymer may be accomplished by any convenient agitation means. Examples of suitable means include large, slowly rotating paddles, effervescing gases, and moderately turbulent flow in conduits which may contain baffles to increase agitation at high flow rates. The agitating means used are designed to provide homogeneous incorporation of the high molecular-weight cationic polymer into the aqueous suspension of solid materials. While it is preferred to avoid significant destruction of any existing agglometrates which may be present in the slurry, obtaining an intimate and uniform admixture of the polymer with the suspension is more important than avoiding some destruction of any existing agglomerates. Accordingly, the polymer is uniformly dispersed in the aqueous suspension with a minimum amount of destruction of any existing agglomerates.

The optimum conditions employed to carry out the process of the present invention will depend, as in the case of any other cationic polymer, on the chemical structure of the particular cationic polymer being employed, the molecular weight of the polymer, and the composition of the particular suspension being dewatered. Applicant's contribution to the art is not the discovery of any particular conditions for dewatering suspensions of solid materials with a cationic polymer but, rather, the unexpected discovery that the water-soluble, cationic polymers described herein are very effective dewatering agents. For example, cationic polymers of this invention have been found to be up to 20 times more effective for dewatering municipal sewage sludges than some commercially available cationic polymers, such as polyethylene imine salt. The greater degree of effectiveness of the cationic polymers of the present invention will improve the economy for dewatering solids in several operations involving the treatment of waste, especially municipal waste. In addition to effectively and efficiently dewatering aqueous suspensions of solid materials, and thereby reducing the weight of the solids for subsequent disposal, the cationic polymeric dewatering agents of the present invention also have an effect upon the consistency and properties of the solids so that they may be more easily filtered and processed.

The cationic polymeric dewatering agents of the present invention may be employed as the sole dewatering agent or in conjunction with other polymeric dewatering agents or in processes which involve the employment of other chemical treating systems such as inorganic salts. The inorganic salts which may be used in conjunction with the polymeric dewatering agents of this invention include any of the acid or neutral salts which are known in the art for treatment of aqueous suspensions of solid materials. A preferred class of such inorganic salts includes the acid and neutral salts of polyvalent metal. Illustrative examples of such inorganic salts include alum, ferric chloride, ferrous chloride, lime, and aluminum chloride. The amount of inorganic salt used is generally within the range of from 0.1 to 100 parts inorganic salt per part of polymer (by weight). In the case of lime, the amount which can be utilized is limited to the point where the salts of the cationic polymer are not substantially destroyed.

After treatment of the aqueous suspension of solid materials with the water-soluble cationic polymeric dewatering agents of the present invention, the resulting suspension is then subjected to dewatering operations conventional in the art such as compaction, filtration, centrifugation, elutriation, and flotation operations. The use of coil filters and centrifuge are particularly preferred. Vacuum may be applied if desired. A typical means for dewatering sludge includes a large rotary drum covered with an open mesh metal fiber filter cloth. As the drum is rotated through the sewage slurry contained in a filter pan below the drum, vacuum is applied by suction toward the center of the drum through the filter cloth. In this manner the sewage solids ("dry sludge cake") are continuously picked up on the filter and removed therefrom by any one of various means such as air pressure or scrapers.

It should be recognized that the organic solid phases to be filtered in accordance with the present invention described herein may, due to their extreme hydrophilicity contain a substantial amount of imbided water. Complete water removal is nearly impossible, but filter cakes obtained by filtering suspensions treated in accordance with this invention will ordinarily contain smaller amounts of water than filter cakes obtained by methods of the prior art.

The following examples are illustrative of the preparation of water-soluble, cationic polymers and their use in dewatering suspensions of solid materials in accordance with the process of this invention. These examples are set forth solely for the purpose of illustration and any specific enumeration of details contained therein should not be interpreted as expressing limitations of this invention. It will be readily apparent to those skilled in the art that other cationic polymers within the description of cationic polymers described above may be prepared by polymerization techniques conventional in the art and substituted for those cationic materials recited in the following examples. All parts and percentages are by weight unless otherwise expressly indicated.

EXAMPLE 1

90 grams of acrylamide are dissolved in 240 ml. of water. To this solution are added 30 grams of the dimethyl sulfate quaternary salt of N-vinyl imidazole. The resulting solution is adjusted to a pH of about 3 using 96% concentrated sulfuric acid. The monomer solution is then subjected to a cobalt 60 gamma radiation source at an intensity of 200,000 rads per hour for 24 minutes to convert 68% of the monomers to a water-soluble, cationic copolymer. The resulting copolymer is precipitated in methanol and dried. The intrinsic viscosity of the copolymer is 4.2 deciliters per gram as measured in 2 normal sodium chloride at 25.5° C.

One liter of sludge from the Darby Creek Treatment Plant, Sharon Hill, Pennsylvania is placed in a crystallizing dish. This sludge contains 7% solids and comprises digested, elutriated primary underflow and trickling filter sludge. A sufficient amount of a 0.2% aqueous solution of the acrylamide-N-vinyl imidazole dimethylsulfate quaternary copolymer is added to the sludge so as to furnish 4 pounds of copolymer per ton of solids in the sludge. The solution of copolymer is added with mixing with a low-speed paddle stirrer. After mixing, a 0.1 square foot filter leaf covered with a polypropylene (Eimco Popr–859) filter cloth is submerged in the conditioned sludge. Vacuum is applied and adjusted to 20 inches mercury and the cake allowed to form for 30 seconds. The filter leaf containing the filter cake is then removed from the sludge, placed in an upright position, and the cake dried for 2.5 minutes. Cake appearance and clarity of the filtrate are noted. The wet cake is then removed from the filter leaf, weighed, dried, and reweighed to calculate the percent dry solids in the filter cake. All tests for a given batch of sludge are compared to a commercially available copolymer containing 3 parts by weight of a polymerized acrylamide and 1 part by weight of polymerized dimethylamino ethylacrylate dimethylsulfate quaternary salt used in an amount of 4 pounds of copolymer per ton of sludge solids. In this way a solids efficiency index can be computed to more adequately compare results. The solids efficiency index is calculated according to the following formula:

Solids Efficiency Index $$=100\ \frac{[\text{Percent solids for test product}]}{\left[\begin{array}{c}\text{Percent solids for 4 pounds}\\ \text{per ton of standard copolymer}\end{array}\right]}$$

The acrylamide N-vinyl imidazole dimethylsulfate quaternary copolymer, when used at a dose of 4 pounds of copolymer per ton of sludge solids gives a filter cake containing 21.2% dry solids and a solids efficiency index of 131. The same copolymer at a dose level of 6 pounds of copolymer per ton of sludge solids gives a filter cake containing 23.2% dry solids and a solids efficiency index of 143. At a dose of 8 pounds per ton, the filter cake contains 22.5% dry solids and has a solids efficiency index of 139. A commercially available polyethylene imine salt gave a dry cake containing 19.9% dry solids and a solids efficiency index of 123 when used at a dose of 40 pounds of polymer per ton of sludge solids.

EXAMPLE 2

37.5 grams of N-vinyl imidazole dimethylsulfate quaternary is dissolved in 350 grams of water. To this solution is added 112.5 grams of acrylamide and the pH of the resulting solution adjusted to 3. The resulting 30% monomer solution is subjected to cobalt 60 gamma radiation at 230,000 rads per hour intensity for 39 minutes to convert 73% of the monomers to copolymer. The copolymer is isolated by precipitation of the copolymer in methanol. The intrinsic viscosity of the resulting copolymer in two normal sodium chloride at 25.5° C. is 4.5 deciliter per gram. The copolymer is tested according to the dewatering procedure described in Example 1. When employed at a dose of 8 pounds of copolymer per ton of sludge solids, a dry filter cake containing 20.2% dry solids is obtained and the solids efficiency index is 119. The use of polyethylene imine salt cationic polymer at a dose of 30 pounds of polymer per ton of dry solids results in a dry filter cake containing 23.0% dry solids and a solids efficiency index of 118. This indicates that about ¼ the amount of the N-vinyl imidazole copolymer is needed to achieve results similiar to those obtained with the polyethylene imine salt.

EXAMPLE 3

A copolymer of 3 parts by weight of the dimethyl sulfate quaternary salt of N-vinyl imidazole and 1 part by weight of polymerized acrylamide having an intrinsic viscosity of 5.0 deciliters per gram in two normal sodium chloride at 25.5° C. is used at a dose of 4 pounds of copolymer per ton of sewage sludge according to the procedure of Example 1. The resulting filter cake contains 21.6% dry solids. The solids efficiency index is 133. In an identical test using polyethylene imine salt at a dose of 40 pounds of polymer per ton of sewage sludge solids, the solids efficiency index is 125. Accordingly, the N-vinyl imidazole copolymer gives results equivalent to the polyethylene imine salt when the N-vinyl imidazole copolymer is used at a dose of ⅒ of the dose employed for the polyethylene imine salt.

EXAMPLE 4

A copolymer of acrylamide, N-vinyl imidazole dimethylsulfate quaternary salt, and dimethylamino ethylmethacrylate dimethylsulfate quaternary salt is prepared according to the following procedure. 60 grams of N-vinyl imidazole dimethylsulfate quaternary is dissolved in 700 grams of water. To this solution are added 15 grams of dimethylamino ethylmethacrylate dimethylsulfate quaternary and 225 grams of acrylamide. The resulting monomer solution is irradiated at an intensity of 150,000 rads per hours using a cobalt 60 gamma radiation source. The resulting copolymer is extracted and precipitated with methanol and dried. The dewatering efficiency of the copolymer is then tested according to the procedure described in Example 1 and is found to give excellent sludge dewatering characteristics as evidenced by a very dry filter cake and a high solids efficiency index.

EXAMPLE 5

The procedure of Example 4 is repeated except that dimethylamino ethylmethacrylate dimethylsulfate quaternary is replaced with dimethylamino ethylacrylate dimethylsulfate quaternary. The copolymer when tested as a sludge dewatering agent according to the procedure given in Example 1 is found to give a dry filter cake and a high solids efficiency index.

EXAMPLE 6

19.5 grams of concentrated sulfuric acid (96.5%) is dissolved in 200 grams of water. After cooling, 37.5 grams of N-vinyl imidazole is added. To the solution is then added 112.5 grams of acrylamide and the pH of the resulting solution adjusted to 4 using concentrated sulfuric acid. The monomer solution is then cooled to 25° C. and radiated with gamma radiation at an intensity of 230,000 rads per hour for one hour. The resulting copolymer is isolated by precipitation with methanol and dried. The conversion is 70% and the copolymer has an intrinsic viscosity of 3.5 deciliters per gram in two normal sodium chloride solution at 25.5° C. A 0.2 weight percent solution of this polymer is tested for its ability to facilitate dewatering of sewage sludge according to the procedure recited in Example 1. The polymer is employed in its sulfuric acid salt form and gives a solids efficiency index of 129 and a percent dry solids of 20.9 when used at a dose of 10 pounds of polymer per ton of solids in the sewage sludge.

EXAMPLE 7

A mixture of 80 parts acrylamide and 20 parts of N-vinyl imidazole dimethylsulfate quaternary are dissolved in 400 parts of deionized water. To this solution is added a mixture of 0.04 parts of potassium persulfate and 0.0035 parts of potassium metabisulfite dissolved in 5 parts of water adjusted to a pH of 3. The resulting mixture is then heated to 60° C. As the polymerization proceeds, the temperature rises and is allowed to increase without cooling during the course of the reaction. After standing overnight, the copolymer formed is collected, reformulated into a 0.2% aqueous solution and evaluated as a sludge dewatering agent in accordance with the procedure recited in Example 1. The cationic copolymer gives dry cakes similar to those found with the cationic copolymer of Example 1.

EXAMPLE 8

A mixture of 80 parts acrylamide and 20 parts of N-vinyl imidazole dimethylsulfate quaternary and 20 parts of dimethylamino ethylacrylate dimethylsulfate quaternary are dissolved in 400 parts of deionized water. To this solution is added a mixture containing 0.04 parts of potassium persulfate and 0.0035 parts of potassium metabisulfite dissolved in 5 parts of water and adjusted to a pH of 3. The reaction mixture is then heated to a temperature of 60° C. and as polymerization proceeds, the temperature is allowed to rise without cooling during the course of the reaction. After standing overnight, the copolymer is collected and reformulated into a 0.2% aqueous solution and evaluated as a sludge dewatering agent as described in Example 1. The copolymer is found to give very dry filter cakes and an excellent solids efficiency index.

EXAMPLE 9

A mixture of 80 parts acrylamide and 20 parts N-vinyl imidazole dimethylsulfate quaternary and 20 parts of dimethylamino ethylmethacrylate dimethylsulfate quaternary are dissolved in 400 parts of deionized water and polymerized according to the procedure of Example 8. The resulting copolymer is an excellent sludge dewatering agent.

A copolymer containing 60% by weight of polymerized acrylamide and 40% by weight of polymerized N-vinyl imidazole-dimethyl sulfate quaternary salt was evaluated in combination with an inorganic salt according to the test procedures recited in Example 1. The results are shown in Table I.

TABLE I

| Example number | Salt | Lbs. salt per ton solids | Lbs. polymer per ton solids | Percent dry solids | Solids efficiency index |
|---|---|---|---|---|---|
| 10 | AlCl₃ | 25 | 10 | 23.0 | 139 |
| 11 | AlCl₃ | 100 | 10 | 22.0 | 133 |
| 12 | Lime | 25 | 10 | 26.4 | 135 |
| 13 | do | 100 | 10 | 21.5 | 130 |
| 14 | Alum | 100 | 10 | 23.6 | 143 |

EXAMPLE 15

The procedure of Example 4 is repeated except that the monomer charge used is a mixture of 10 parts acrylonitrile, 80 parts of N-vinyl imidazole, and 10 parts N-vinyl imidazole dimethyl sulfate quaternary salt. The copolymer when tested as a sludge dewatering agent provides efficient and rapid dewatering of aqueous suspensions of finely divided solid materials.

EXAMPLE 16

The procedure of Example 1 is repeated except that the monomer charge employed is a mixture of 50 parts of the dimethyl sulfate quaternary salt of N-vinyl imidazole, 10 parts of vinyl sulfonic acid, and 50 parts of acrylamide. The resulting copolymer is an excellent sludge dewatering agent which causes rapid flocculation and sedimentation of the solids.

EXAMPLE 17

90 grams of acrylamide are dissolved in 240 ml. of water. To this solution are added 30 grams of the dimethyl sulfate quaternary salt of N-vinyl imidazole. The resulting solution is adjusted to a pH of about 3 using 96% concentrated sulfuric acid. The monomer solution is then subjected to a cobalt 60 gamma radiation source at an intensity of 200,000 rads per hour for 24 minutes to convert 68% of the monomers to a water-soluble, cationic copolymer. The reaction product is a viscous solution of the copolymer and unreacted monomers in water. The reaction product is diluted with water to form an aqueous solution containing 0.3% of the copolymer. The dilute solution is added to the sludge recited in Example 1 to furnish 2 pounds of the copolymer per ton of sludge solids. The solids efficiency index and percent of solids in the filter cake are high and the consistency and properties of the solids are such that they are readily filtered and processed.

EXAMPLE 18

60 parts of the dimethyl sulfate quaternary salt of N-vinyl imidazole are dissolved in 40 parts of water. The solution is subjected to a cobalt 60 gamma radiation source at an intensity of 350,000 rads per hour for 120 minutes to convert 84% of the monomer to a water-soluble, cationic homopolymer. The homopolymer is an excellent dewatering agent for treating sewage sludge.

The following table summarizes the results obtained when the indicated several polymers are used to dewater sludge in accordance with the present invention. The polymers are water-soluble and have an intrinsic viscosity in 2 normal sodium chloride at 25.5° C. of at least 0.2 deciliters per gram. The polymers are evaluated as sludge dewatering agents in accordance with the procedure set forth in Example 1 except that a 1% aqueous solution of the polymer is used. The filter yield in pounds per hour per square foot of filter area is determined by multiplying the dry cake weight by 0.441.

be apparent to those skilled in the art that other different and equivalent polymers may be substituted for those described without departing from the principles and true spirit of this invention.

Having described the invention, what is desired to be protected by Letters Patent is:

1. A process of facilitating the dewatering of an aqueous suspension of finely divided solid material which comprises mixing with the suspension a water-soluble, cationic polymer containing at least 5% by weight of polymerized N-vinyl imidazole or salt thereof and up to 95% of at least one polymerized monomer characterized by the formula

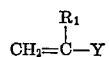

wherein $R_1$ is hydrogen or methyl and Y is

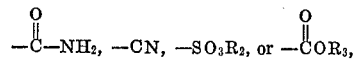

wherein $R_2$ is hydrogen or alkali metal and wherein $R_3$ is hydrogen, alkali metal or $-OCH_2CH_2N(R)_3 \cdot X$ wherein each R is independently an alkyl group having from 1 to 4 carbon atoms and X is an anion, with the proviso that the polymer does not contain more than 25% by weight of polymerized monomer characterized by the formula

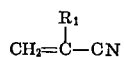

wherein $R_1$ is hydrogen or an alkyl group containing from 1 to 4 carbon atoms, wherein the aqueous suspension of finely divided solid material is sewage sludge, wherein the amount of said cationic polymer used is within the range of from about 0.5 to 50 pounds of polymer per ton of solid material on a dry basis, and wherein the cationic polymer employed has an intrinsic viscosity of at least 0.2 deciliters per gram in two normal sodium chloride at 25.5° C.

2. A process of Claim 1 wherein the water-soluble, cationic polymer has an intrinsic viscosity of from 0.2 to 15 deciliters per gram as measured in two normal sodium chloride solution at 25.5° C.

3. A process of Claim 1 wherein the water-soluble, cationic polymer contains from 10 to 80 weight percent of polymerized N-vinyl imidazole or salt thereof and from 90 to 20 weight percent of at least one polymerized monomer characterized by the said formula.

4. A process of Claim 3 wherein the polymerized N-vinyl imidazole is present in salt form.

5. A process of Claim 4 wherein the salt is a salt of sulfuric acid or hydrochloric acid.

6. A process of Claim 4 wherein the polymerized N-vinyl imidazole salt is a quaternary salt.

7. A process of Claim 6 wherein the quaternary salt is a quaternary salt of benzyl chloride or a dialkyl sulfate

TABLE I

| Example number | Polymer [1] | Dose [2] | Percent dry solids | Filter yield |
| --- | --- | --- | --- | --- |
| 19 | 70% AAD, 30% VMIZ-Q | 10 | 23.6 | 4.9 |
| 20 | 60% AAD, 40% VMIZ-Q | 10 | 20.2 | 4.1 |
| 21 | 50% AAD, 50% VMIZ-Q | 10 | 24.2 | 3.9 |
| 22 | 50% AAD, 20% VIAZ-Q, 20% DMAEM-Q | 8 | 24.7 | 3.4 |
| 23 | 70% AAD, 10% VIAZ-Q, 20% DMAEA-Q | 8 | 19.4 | 3.4 |
| 24 | 80% AAD, 20% VIAZ-Q | 8 | 21.5 | 3.2 |
| 25 | 70% AAD, 30% VIAZ-Q | 8 | 20.4 | 4.1 |
| 26 | 60% AAD, 40% VIAZ-Q | 6 | 21.5 | 3.9 |
| 27 | 50% AAD, 50% VIAZ-Q | 6 | 21.5 | 4.4 |
| 28 | 25% AAD, 75% VIAZ-Q | 6 | 31.9 | 6.9 |

[1] AAD=Acrylamide; VMIZ-Q=1-vinyl-2-methylimidazole dimethylsulfate quarternary; VIAZ-Q=1-vinylimidazole dimethylsulfate quarternary; DMAEM-Q=Dimethylaminoethyl methylacrylate dimethylsulfate quarternary; DMAEA-Q=Dimethylaminoethyl acrylate dimethylsulfate qaurternary.
[2] Pounds of polymer per ton of sludge solids.

Although this invention has been described with reference to specific water-soluble cationic polymers, it will or alkyl halide wherein each alkyl group contains from 1 to 4 carbon atoms.

8. A process of Claim 1 wherein the water-soluble, cationic polymer is a copolymer of a quaternary salt of N-vinyl imidazole and at least one monomer selected from the group consisting of acrylamide and methacrylamide.

9. A process of Claim 1 wherein the water-soluble, cationic polymer is a copolymer of a quaternary salt of N-vinyl imidazole and at least one monomer selected from the group consisting of quaternary salts of dimethylamino ethylacrylate and quaternary salts of dimethylamino ethylmethacrylate.

10. A process of Claim 1 wherein the water-soluble, cationic polymer is a copolymer of a quaternary salt of N-vinyl imidazole and an alkali metal salt of acrylic or methacrylic acid.

11. A process of Claim 1 wherein the water-soluble cationic polymer is a copolymer of a quaternary salt of N-vinyl imidazole, acrylamide, and a monomer selected from the group consisting of quaternary salts of dimethylamino ethylacrylate and quaternary salts of dimethylamino ethylmethacrylate.

12. A process of Claim 1 wherein the water-soluble, cationic polymer has an intrinsic viscosity of from 1 to 8 as measured in two normal sodium chloride at 25.5° C.

13. A process of Claim 12 wherein the water-soluble cationic polymer contains from 10 to 80% by weight of polymerized N-vinyl imidazole salt.

14. A process of Claim 1 wherein the water-soluble, cationic polymer is used in conjunction with an acidic or neutral inorganic salt.

15. A process of Claim 1 wherein the polymer is a water-soluble, cationic copolymer containing from 10 to 80 weight percent of polymerized N-vinyl imidazole dimethyl sulfate quaternary salt and from 90 to 20 weight percent of polymerized acrylamide.

16. A process of Claim 1 wherein the water-soluble, cationic polymer is a polymer of 1-vinyl-2-methylimidazole quaternary salt.

17. A process of claim 1 wherein the water-soluble, cationic polymer is a copolymer of acrylamide and 1-vinyl-2-methylimidazole quaternary salt.

18. A process of Claim 1 wherein the water-soluble, cationic polymer is a copolymer of methacrylamide and 1-vinylimidazole salt.

19. A process of Claim 1 wherein the water-soluble, cationic polymer is a copolymer of acrylamide, 1-vinylimidazole quaternary salt, and dimethylaminoethyl methacrylate or acrylate quaternary salt.

References Cited
UNITED STATES PATENTS

| | | | |
|---|---|---|---|
| 2,875,062 | 2/1959 | Werner | 99—48 |
| 3,509,046 | 4/1970 | Annand et al. | 210—54 |
| 3,640,936 | 2/1972 | Williams | 210—54 |
| 3,288,707 | 11/1966 | Hurwitz et al. | 210—54 |
| 3,440,056 | 4/1969 | McFadden et al. | 99—48 |

SAMIH N. ZAHARNA, Primary Examiner

B. CASTEL, Assistant Examiner

U.S. Cl. X.R.

210—10